US012413101B2

United States Patent
Choi et al.

(10) Patent No.: US 12,413,101 B2
(45) Date of Patent: Sep. 9, 2025

(54) METHOD AND DEVICE FOR TRANSMITTING AND RECEIVING BASED ON WIRELESS COMMUNICATION USING RECONFIGURABLE INTELLIGENT REFLECTING SURFACES

(71) Applicant: RESEARCH & BUSINESS FOUNDATION SUNGKYUNKWAN UNIVERSITY, Suwon-si (KR)

(72) Inventors: Kae Won Choi, Suwon-si (KR); Mihn Tran Nguyen, Suwon-si (KR); Je Hyeon Park, Suwon-si (KR); Myeong Chan Ha, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 391 days.

(21) Appl. No.: 18/075,590

(22) Filed: Dec. 6, 2022

(65) Prior Publication Data

US 2023/0261376 A1 Aug. 17, 2023

(30) Foreign Application Priority Data

Dec. 6, 2021 (KR) .......................... 10-2021-0172730

(51) Int. Cl.
*H02J 50/20* (2016.01)
*H01Q 3/46* (2006.01)
*H02J 50/23* (2016.01)
*H02J 50/40* (2016.01)
*H02J 50/50* (2016.01)
*H04B 7/04* (2017.01)
*H04B 7/0408* (2017.01)
*H04B 7/06* (2006.01)

(52) U.S. Cl.
CPC .............. *H02J 50/20* (2016.02); *H01Q 3/46* (2013.01); *H02J 50/23* (2016.02); *H02J 50/40* (2016.02);

(Continued)

(58) Field of Classification Search
CPC .. H02J 50/20; H02J 50/23; H02J 50/27; H02J 50/50; H02J 50/40; H02J 50/402;

(Continued)

(56) References Cited

U.S. PATENT DOCUMENTS 11,075,463 B2    7/2021  Lipworth et al.
11,095,166 B2    8/2021  Biderman et al.
(Continued)

FOREIGN PATENT DOCUMENTS

CN    112838884 A   *  5/2021  ........... H04B 7/0695
CN    112865845 A   *  5/2021  ............... H01Q 3/04
(Continued)

OTHER PUBLICATIONS

Tran, Nguyen Minh, et al. "Multifocus techniques for reconfigurable intelligent surface-aided wireless power transfer: Theory to experiment." IEEE Internet of Things Journal 9.18 (Aug. 2022): 17157-17171. (Year: 2022).*

(Continued)

*Primary Examiner* — Ryan Johnson
(74) *Attorney, Agent, or Firm* — NSIP Law

(57) ABSTRACT

Provided is a method for transmitting power in wireless communication using reconfigurable intelligent reflecting surfaces (RIS) of an electronic device, which includes: determining a value of a reflection coefficient of each unit cell or tile by scanning each tile of a reconfigurable intelligent reflecting surface (RIS) by a signal radiated through a transmitter; sending a beam to the reconfigurable intelligent reflecting surface (RIS) by controlling the transmitter; and multi-focusing an electromagnetic wave signal incident on the reconfigurable intelligent reflecting surface (RIS) on a plurality of receivers by setting an on/off state in each unit cell of the reconfigurable intelligent reflecting surface (RIS) based on the determined control parameter value, in which (Continued)

the tile is a partial array of the RIS having the same size, and supports far-field communication for the plurality of receivers.

14 Claims, 17 Drawing Sheets

(52) U.S. Cl.
CPC .......... *H02J 50/50* (2016.02); *H04B 7/04013* (2023.05); *H04B 7/0408* (2013.01); *H04B 7/0686* (2013.01)

(58) Field of Classification Search
CPC .. H04B 7/04013; H04B 7/0617; H04B 7/145; H04B 5/79; H01Q 3/46
See application file for complete search history.

(56) References Cited

U.S. PATENT DOCUMENTS

| | | |
|---|---|---|
| 2021/0126359 A1 | 4/2021 | Kim et al. |
| 2021/0175931 A1 | 6/2021 | Choi et al. |
| 2022/0216908 A1 | 7/2022 | Choi et al. |

FOREIGN PATENT DOCUMENTS

| | | |
|---|---|---|
| KR | 10-2192234 B1 | 12/2020 |
| KR | 10-2240566 B1 | 4/2021 |
| KR | 10-2330915 B1 | 12/2021 |
| WO | WO 2021/109345 A1 | 6/2021 |

OTHER PUBLICATIONS

Tran, Nguyen Minh, et al. "Multi-device charging RIS-aided wireless power transfer systems." 2021 International Conference on Information and Communication Technology Convergence (ICTC). IEEE, Oct. 2021. (Year: 2021).*
Yu, Shixing, Haixia Liu, and Long Li. "Design of near-field focused metasurface for high-efficient wireless power transfer with multifocus characteristics." IEEE Transactions on Industrial Electronics 66.5 (2018): 3993-4002. (Year: 2018).*
Wu, Qingqing, et al. "Towards Smart and Reconfigurable Environment: Intelligent Reflecting Surface Aided Wireless Network." IEEE communications magazine 58.1 (2019): 106-112.
Zhao, Ming-Min, et al. "Exploiting Amplitude Control in Intelligent Reflecting Surface Aided Wireless Communication with Imperfect CSI." IEEE Transactions on Communications 69.6 (2021): 4216-4231.

* cited by examiner

[FIG.1]
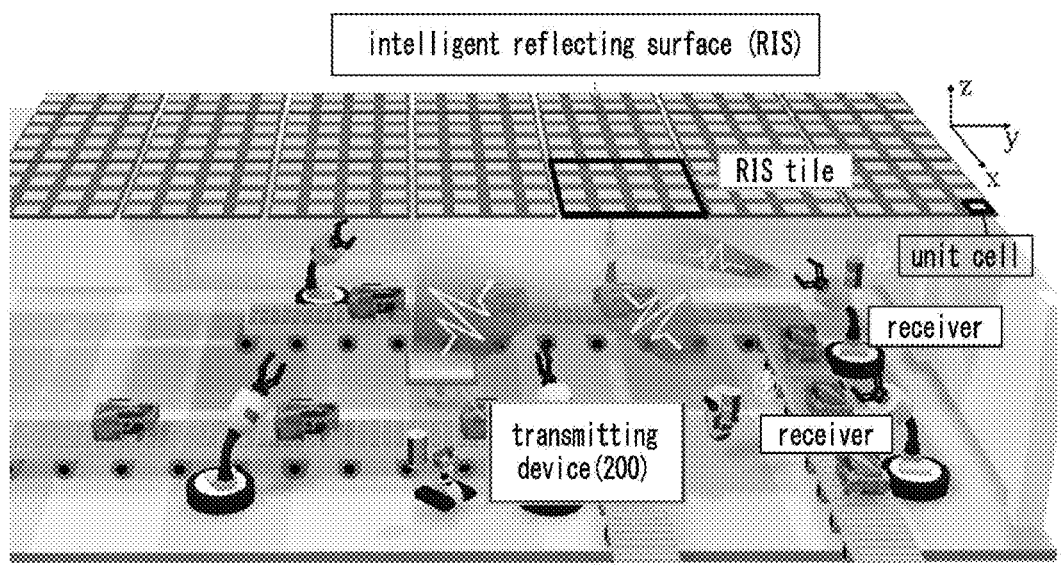

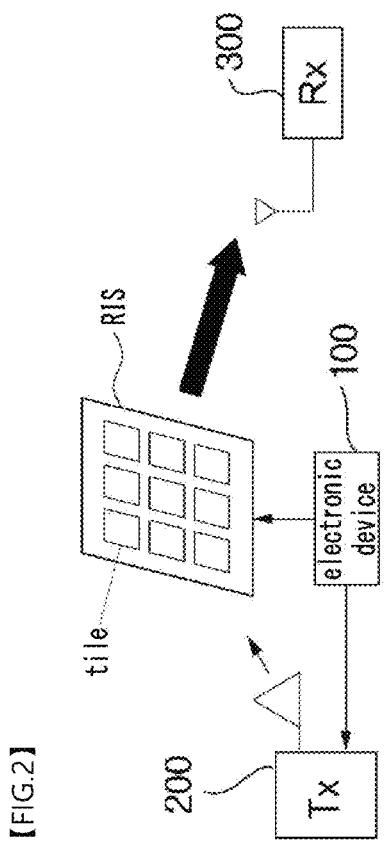

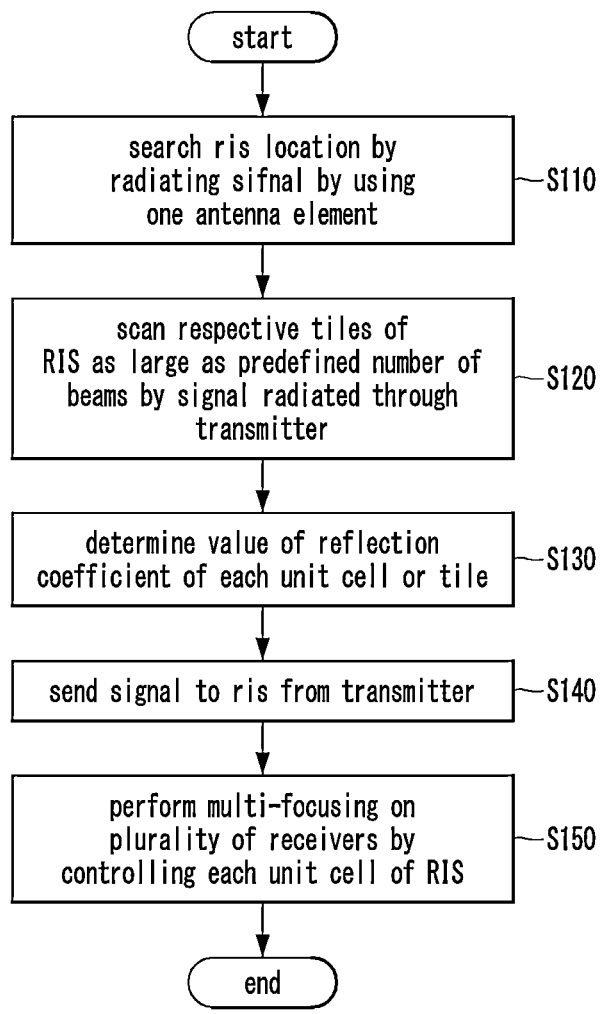
[FIG.3]

[FIG.4A]
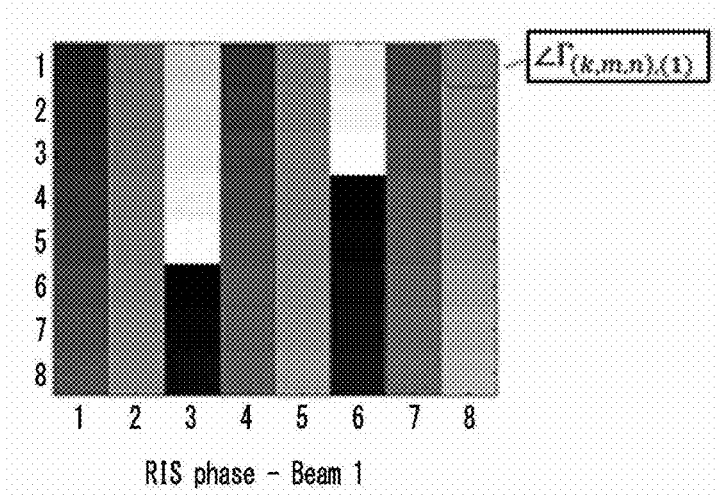
[FIG.4B]
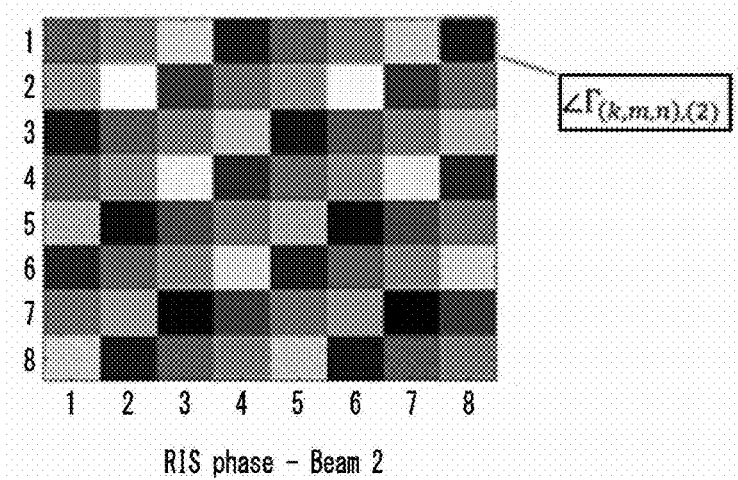
[FIG.4C]
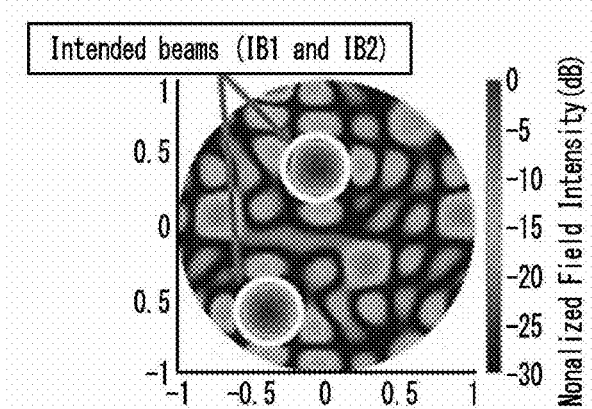

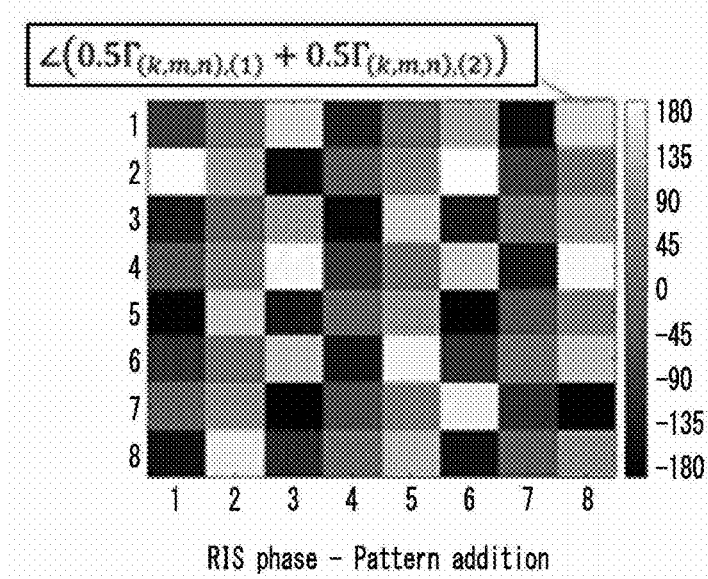
[FIG.4D]

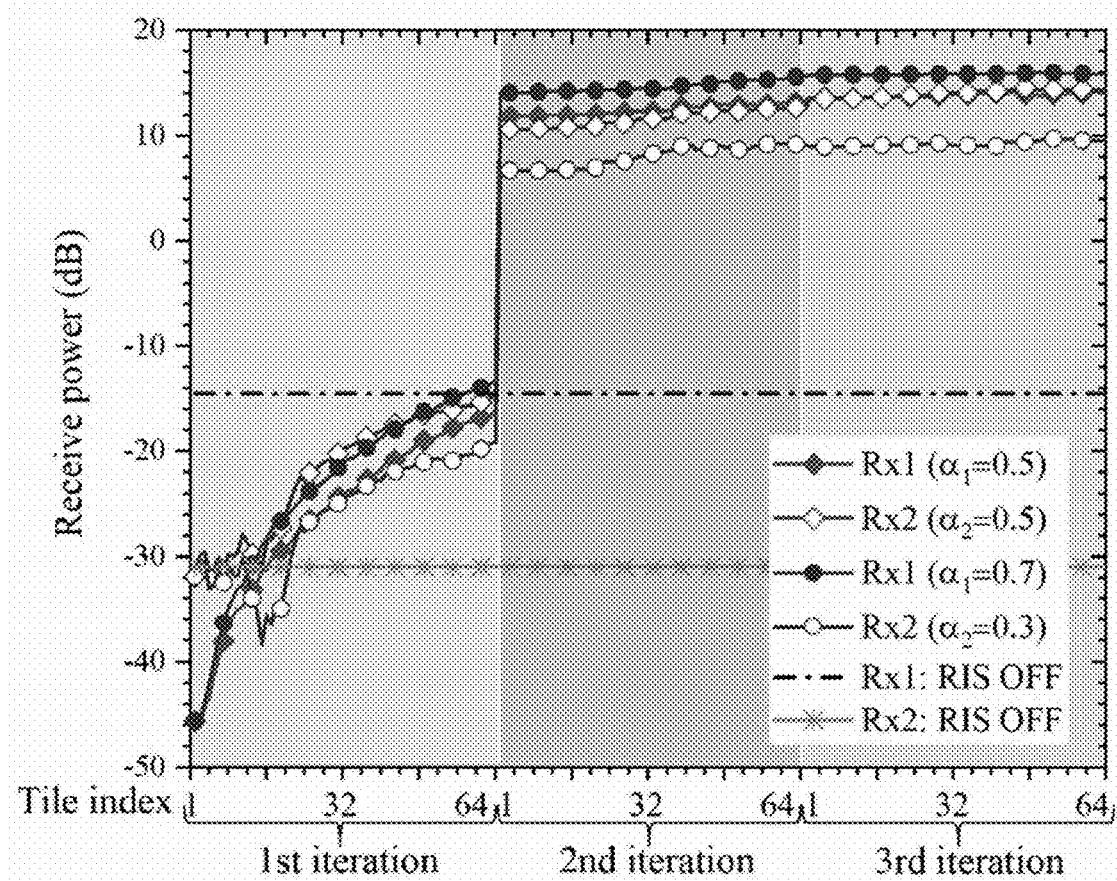
[FIG.5]

[FIG.6A]
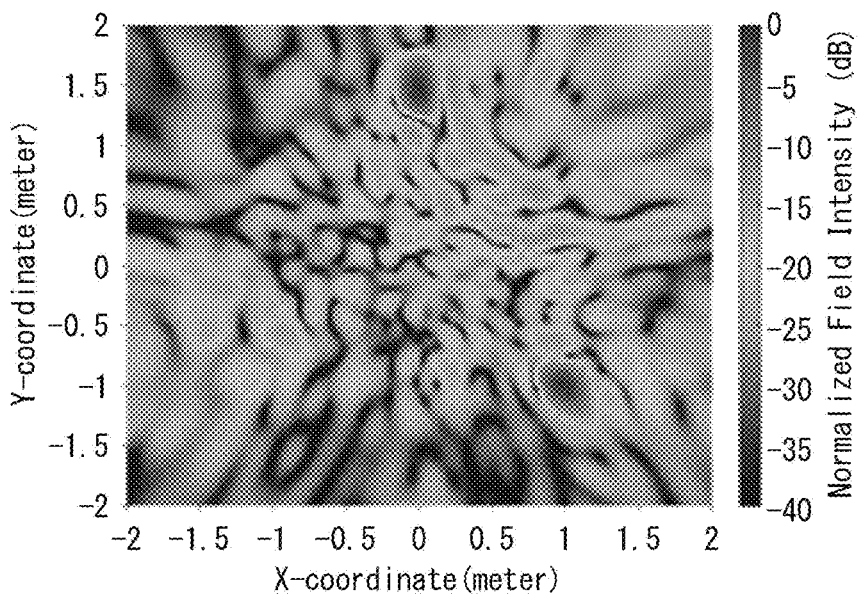
$\alpha_1 = \alpha_2 = 0.5$
[FIG.6B]
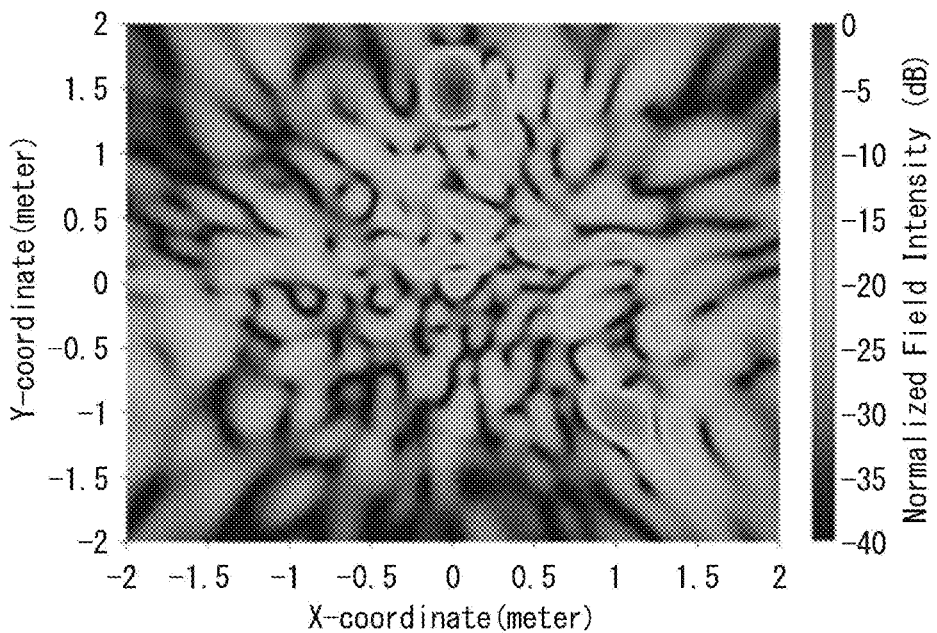
$\alpha_1 = 0.7, \alpha_2 = 0.3$

[FIG.7A]
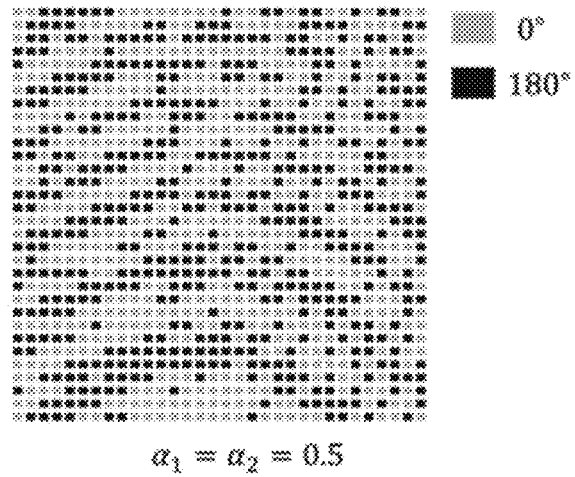
$\alpha_1 = \alpha_2 = 0.5$
[FIG.7B]
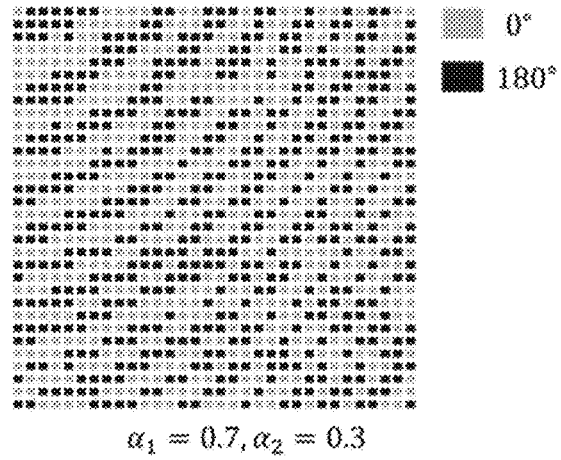
$\alpha_1 = 0.7, \alpha_2 = 0.3$

[FIG.8A]
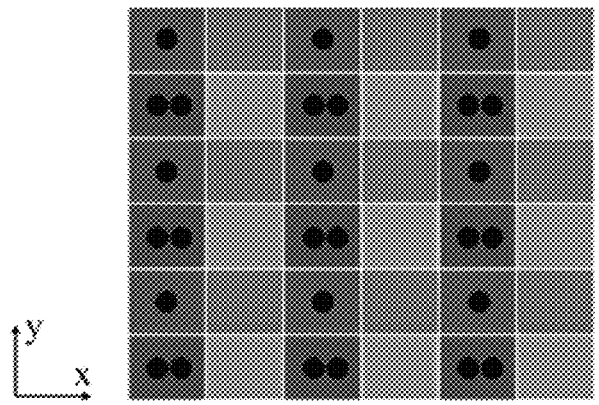
- Unit cell allocated to beam 1
- Unit cell allocated to beam 2
- Unit cell allocated to beam 3
- Unit cell allocated to beam 4
[FIG.8B]
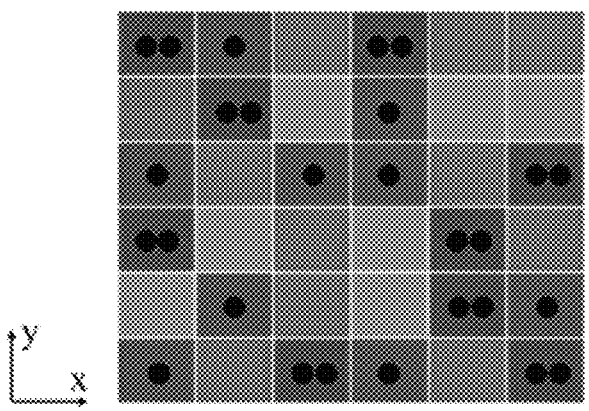
- Unit cell allocated to beam 1
- Unit cell allocated to beam 2
- Unit cell allocated to beam 3
- Unit cell allocated to beam 4

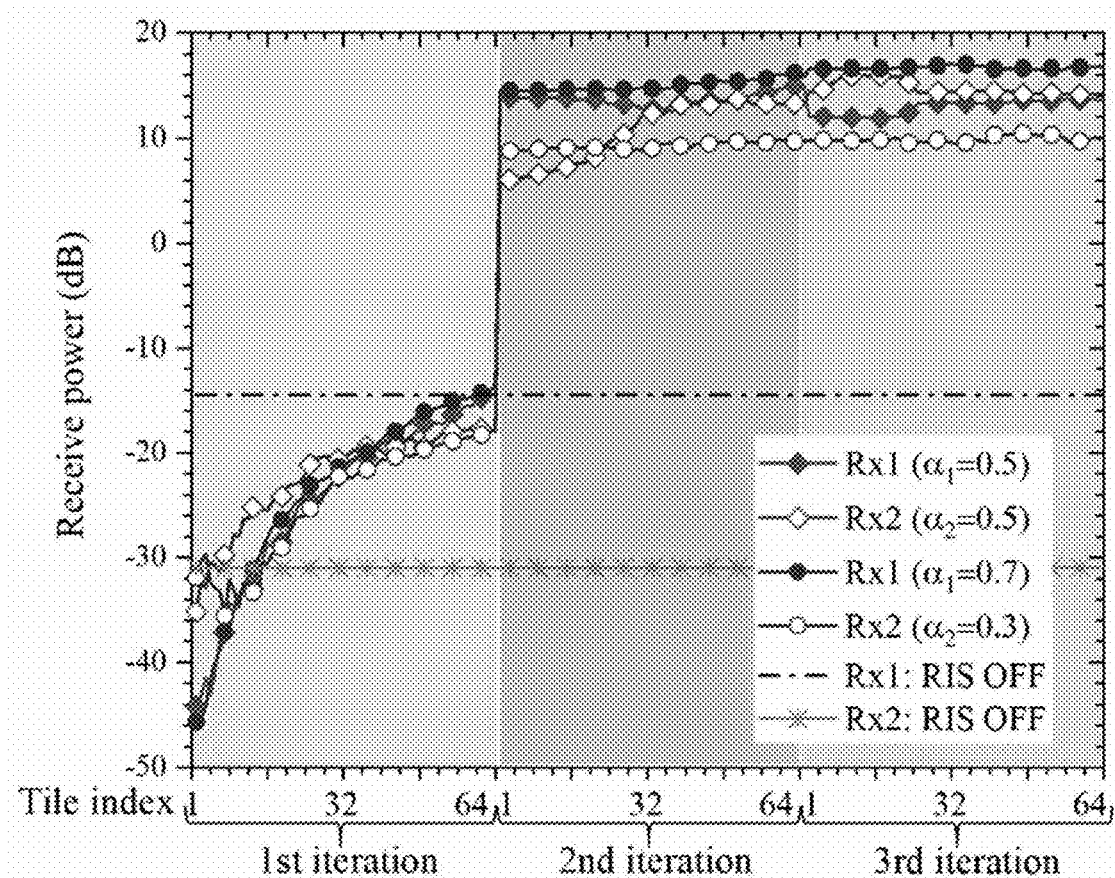
[FIG.9]

[FIG.10A]
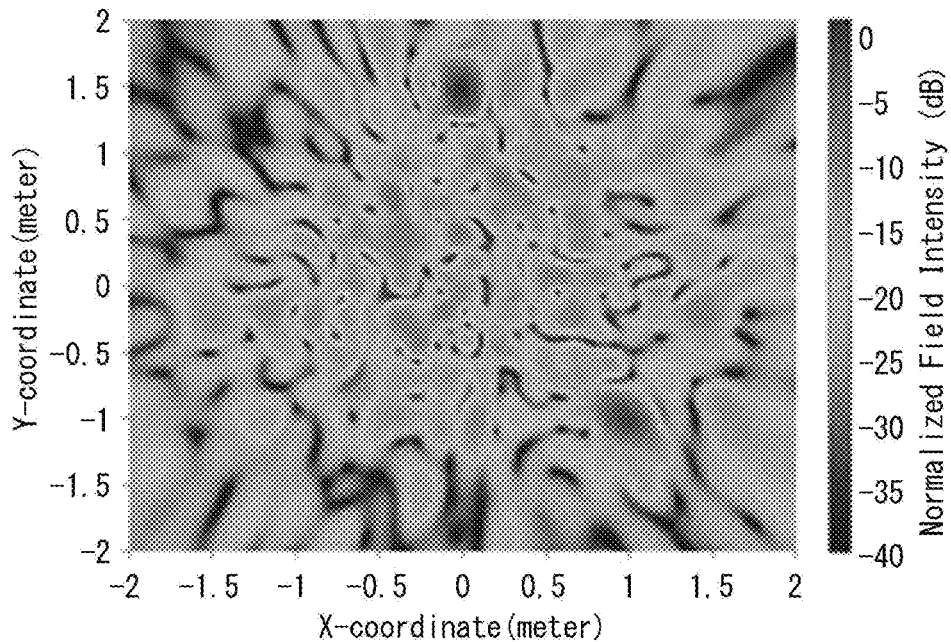
$\alpha_1 = \alpha_2 = 0.5$
[FIG.10B]
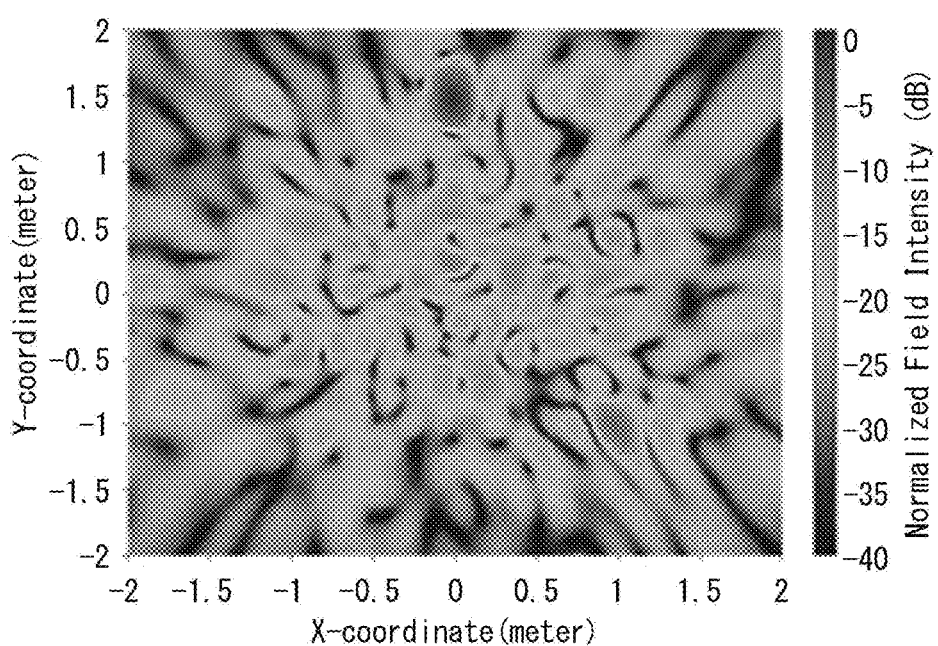
$\alpha_1 = 0.7, \alpha_2 = 0.3$

[FIG.11A]
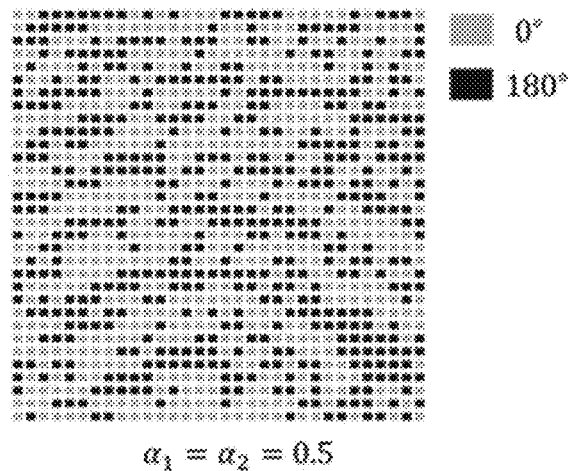
$\alpha_1 = \alpha_2 = 0.5$
[FIG.11B]
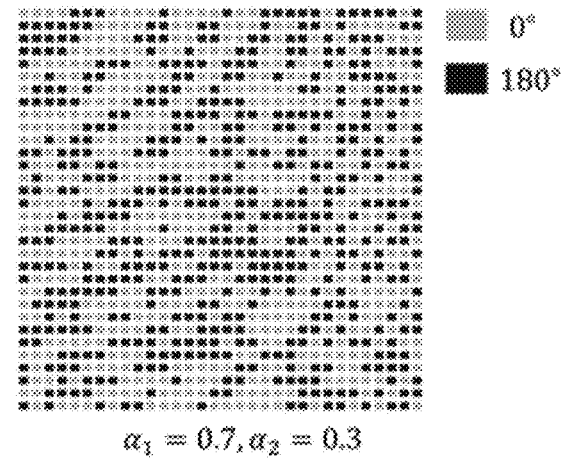
$\alpha_1 = 0.7, \alpha_2 = 0.3$

[FIG.12]
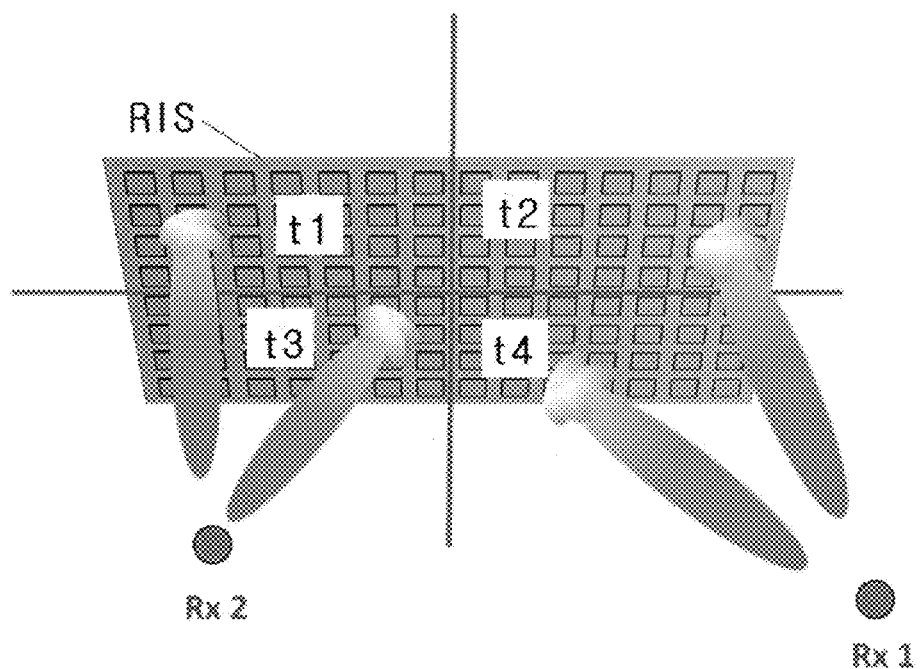

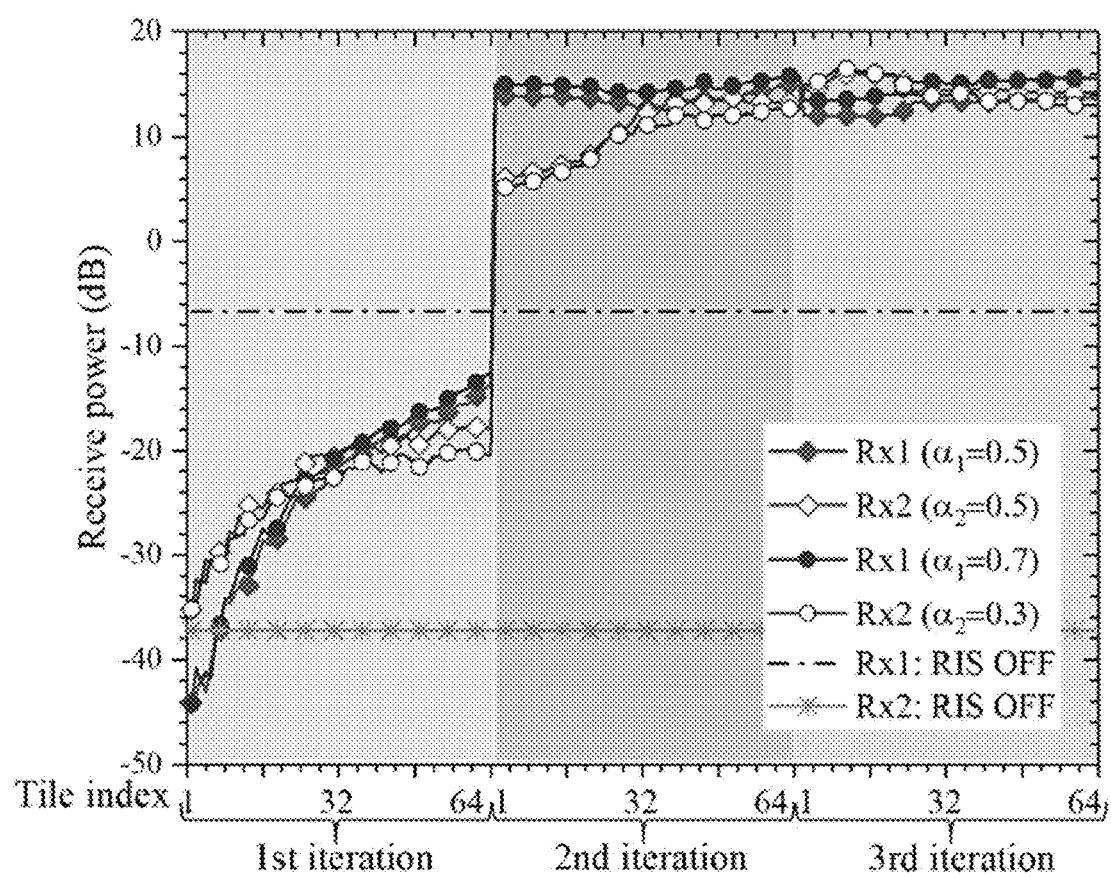
[FIG.13]

[FIG.14A]
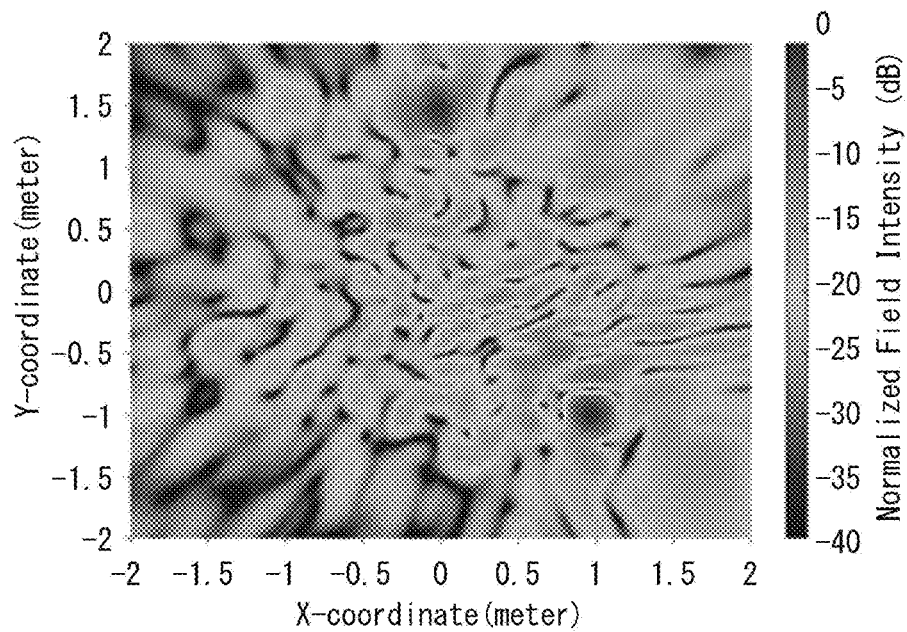
$\alpha_1 = \alpha_2 = 0.5$
[FIG.14B]
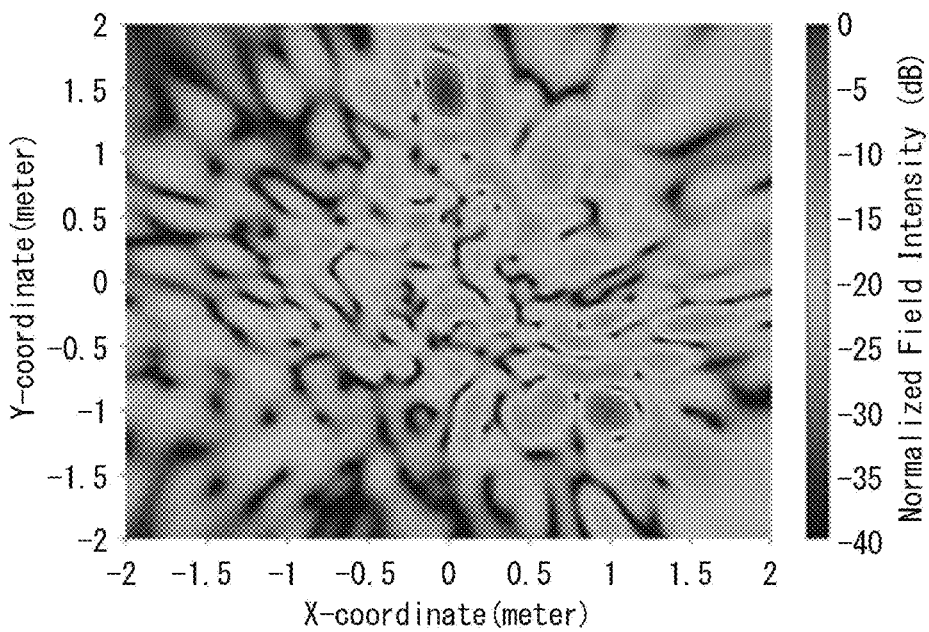
$\alpha_1 = 0.7, \alpha_2 = 0.3$

[FIG.15A]
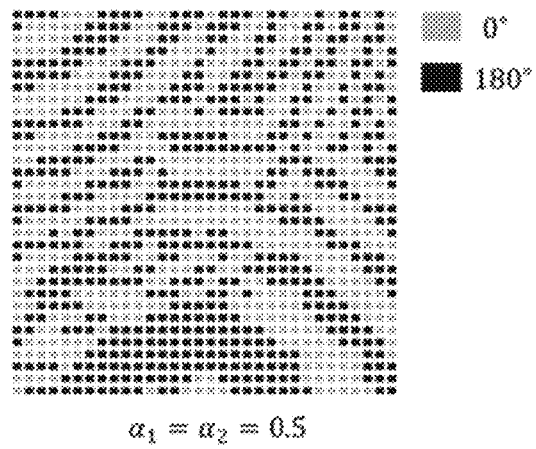
$\alpha_1 = \alpha_2 = 0.5$
[FIG.15B]
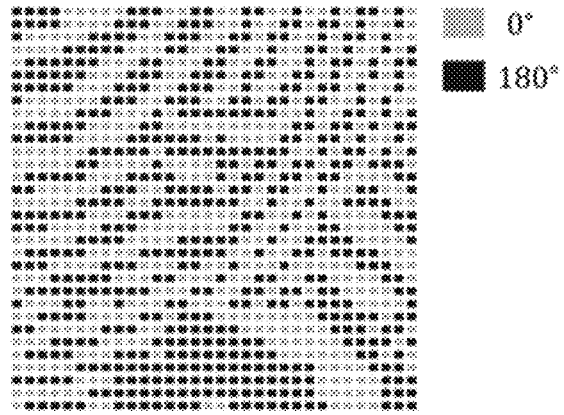
$\alpha_1 = 0.7, \alpha_2 = 0.3$

[FIG.16]
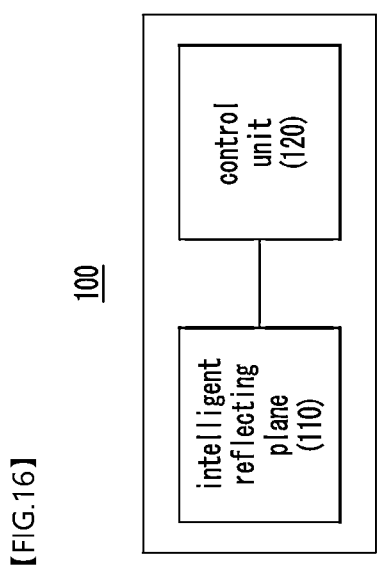

METHOD AND DEVICE FOR TRANSMITTING AND RECEIVING BASED ON WIRELESS COMMUNICATION USING RECONFIGURABLE INTELLIGENT REFLECTING SURFACES

CROSS-REFERENCE TO RELATED APPLICATIONS

This application claims the benefit under 35 USC 119(a) of Korean Patent Application No. 10-2021-0172730 filed on Dec. 6, 2021, in the Korean Intellectual Property Office, the entire disclosure of which is incorporated herein by reference for all purposes.

TECHNICAL FIELD

The present invention relates to a method and a device for transmitting and receiving based on wireless communication using reconfigurable intelligent reflecting surfaces.

BACKGROUND ART OF INVENTION

Various applications are expected to appear Autonomous mobility, industrial automation, communication between a user and things, etc., in a next-generation wireless network (e.g., 5G/6G network or more). Therefore, the number of devices connected to Internet of Everything (IoE) is expected to reach hundreds of billions by 2030. In line with the 4th Industrial Revolution, society is rapidly subjected to hyperconnectivity and superintelligence, and many IoT devices are being placed in everyday life. In the near future, more IoT devices will be developed and commercialized, and sufficient power supply to IoT devices has emerged as a big topic. In terms of installation costs and maintenance, the efficiency of wired power or battery replacement method is significantly reduced, and research on wireless power transmission is actively conducted as a solution.

In the field of wireless power transmission, the RF Wireless Power Transfer (RF WPT) can be transmitted wirelessly to electronic equipment located at a distance, making it more suitable for the charging of the above-mentioned IoT devices. The biggest challenge of microwave power transmission technology is how to concentrate the electromagnetic waves transmitted to the small receiver. It is the core technology of microwave power transmission to increase the ending efficiency through energy beamforming, and the power can be concentrated on the receiver by adjusting the phase of each antenna using an antenna array consisting of a plurality of antenna in the transmitter. Furthermore, the technology that charges multiple devices simultaneously through RF-WPT technology has also been actively studied.

A reconfigurable intelligence surface (RIS) is a rapidly emerging technology in the RF WPT system related research. The RIS is implemented in numerous unit cells, and each unit cell of these RIS can change the characteristics of the phase, power, and polarization of electromagnetic waves that pass or reflect through this. The RIS means a technology that can control the reaction of the entire RIS by changing the characteristics of the unit cell by applying the voltage by adding a variable element such as a PIN diode or varactor to each unit cell. The RIS is constituted by very simple passive elements such as a capacitor, an inductor, a varactor, etc., and has an advantage in that cost and system complexity is remarkably low unlike the existing large MIMO and phase array antenna constituted by the RF chains such as a phase shifter, an amplifier, an attenuator, etc.

In the RF WPT system, it is difficult to guarantee a long-time operation of a large connected device only by single charging. Therefore, the development of a technology capable of wirelessly charging various devices at the same time is required.

Further, in the RF WPT system utilizing the RIS, power reflected in the RIS should be evenly distributed to each device according to requirements, and electromagnetic beams should be adaptively formed in the case of mobile devices. Moreover, in the case of the WPT system, there is a problem in that a long-distance field assumption cannot be guaranteed like wireless communication.

DISCLOSURE OF INVENTION

Technical Problem to be Solved

An exemplary embodiment of the present invention proposes a method and a system for transmitting wireless power using configurable intelligent reflecting surfaces capable of adaptively steering multiple beams capable of simultaneously charging multiple devices based on reception power by using reconfigurable intelligent reflecting surfaces (RIS).

Technical Solution to Solve Problems

According to an aspect of the present invention, there is provided a method for transmitting power in wireless communication using reconfigurable intelligent reflecting surfaces (RIS) of an electronic device, which includes: determining a value of a reflection coefficient of each unit cell or tile by scanning each tile of a reconfigurable intelligent reflecting surface (RIS) by a signal radiated through a transmitter; sending a beam to the reconfigurable intelligent reflecting surface (RIS) by controlling the transmitter; and multi-focusing an electromagnetic wave signal incident on the reconfigurable intelligent reflecting surface (RIS) on a plurality of receivers by setting an on/off state in each unit cell of the reconfigurable intelligent reflecting surface (RIS) based on the determined control parameter value, in which the tile is a partial array of the RIS having the same size, and supports far-field communication for the plurality of receivers.

According to an exemplary embodiment, the electronic device determines a reflection coefficient for each tile, and calculates a reflection coefficient acquired by applying a predetermined weight to an initial reflection coefficient of each beam, and determines a value acquired adding reflection coefficients acquired by applying respective weights to all beams formed by the tile as a final reflection coefficient. According to an exemplary embodiment, the beams formed by the tile are formed as large as the number which is the same as the number of receivers.

According to an exemplary embodiment, the reflection coefficient for each tile is determined, and the final reflection coefficient is calculated by applying a random probability variable to an initial reflection coefficient of each unit cell.

According to an exemplary embodiment, a predetermined receiver is assigned to each tile in advance, and the reflection coefficient for each tile is determined.

According to an exemplary embodiment, the receiver is assigned to each tile based on a reception power increase rate of the receiver.

According to an exemplary embodiment, the method further includes, before the determining the value of the reflection coefficient of each unit cell or tile, controlling the transmitter to search an RIS location by radiating a signal by using one antenna element.

According to another aspect of the present invention, there is provided an electronic device including: a reconfigurable intelligent reflecting surface (RIS) including a plurality of unit cell arrays; and a control unit scanning each tile of the reconfigurable intelligent reflecting surface (RIS) by the signal radiated through the transmitter to determine the value of the reflection coefficient of each unit cell or tile, and sets an on/off state in each unit cell of the reconfigurable intelligent reflecting surface RIS based on the determined control parameter value to control the reconfigurable intelligent reflecting surface (RIS) so as to multi-focus the electromagnetic signal incident on the reconfigurable intelligent reflecting surface (RIS) on a plurality of receivers.

Advantageous Effects of Invention

According to an exemplary embodiment of the present invention, multiple de ices can be simultaneously charged based on reception power by performing adaptive multi-beam steering using RIS.

BRIEF DESCRIPTION OF DRAWINGS

FIG. 1 is a conceptual view for describing a system for transmitting power based on wireless communication using reconfigurable intelligent reflecting surfaces according to an exemplary embodiment of the present invention.

FIG. 2 is a configuration diagram for a system for transmitting power based on wireless communication using reconfigurable intelligent reflecting surfaces according to an exemplary embodiment of the present invention.

FIG. 3 is a flowchart for describing a method for transmitting power based on wireless communication using reconfigurable intelligent reflecting surfaces according to an exemplary embodiment of the present invention.

FIGS. 4A to 4D are diagrams for describing a method for controlling a control parameter in order to send multiple beams according to a first exemplary embodiment of the present invention.

FIG. 5 is a graph showing reception power of each receiver depending on the number of scanning times according to the first exemplary embodiment of the present invention.

FIGS. 6A and 6B are diagrams illustrating a propagation strength normalized to an X-Y plane depending on weight setting according to the first exemplary embodiment of the present invention.

FIGS. 7A and 7B are diagrams illustrating an RIS reflection phase set according to the first exemplary embodiment of the present invention.

FIGS. 8A and 8B are diagrams for describing a method for controlling a control parameter in order to send multiple beams according to a second exemplary embodiment of the present invention.

FIG. 9 is a graph showing reception power of each receiver depending on the number of scanning times according to the second exemplary embodiment of the present invention.

FIGS. 10A and 10B are diagrams illustrating a propagation strength normalized to an X-Y plane depending on weight setting according to the second exemplary embodiment of the present invention.

FIGS. 11A and 11B are diagrams illustrating an RIS reflection phase set according to the second exemplary embodiment of the present invention.

FIG. 12 is a diagram for describing a method for controlling a control parameter in order to send multiple beams according to a third exemplary embodiment of the present invention.

FIG. 13 is a graph showing reception power of each receiver depending on the number of scanning times according to the third exemplary embodiment of the present invention.

FIGS. 14A and 14B are diagrams illustrating a propagation strength normalized to an X-Y plane depending on weight setting according to the third exemplary embodiment of the present invention.

FIGS. 15A and 15B are diagrams illustrating an RSI reflection phase set according to the first exemplary embodiment of the present invention.

FIG. 16 is a diagram for describing a configuration of an electronic device according to an exemplary embodiment of the present invention.

DETAILED DESCRIPTION FOR IMPLEMENTING INVENTION

Since the present invention can make various changes and have various embodiments, specific embodiments will be illustrated in the drawings and described in detail in the detailed description. However, this is not intended to limit the present invention to specific embodiments, and should be understood to include all modifications, equivalents, and substitutes included in the spirit and scope of the present invention. In describing each drawing, reference numerals refer to like elements.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present invention. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Throughout the specification and claims, unless explicitly described to the contrary, a case where any part "includes" any component will be understood to imply the inclusion of stated components but not the exclusion of any other component.

In the present invention, a far-field area means an area in which a strength distribution of an electromagnetic field of an angle function is intrinsically irrelevant to a distance from an antenna, and a near-field area means in which an angle distribution of an electromagnetic field radiated by the antenna depends on the distance of the antenna.

FIG. 1 is a conceptual view for describing a system for transmitting power based on wireless communication using reconfigurable intelligent reflecting surfaces according to an exemplary embodiment of the present invention, and FIG. 2 is a configuration diagram for a system for transmitting power based on wireless communication using reconfigurable intelligent reflecting surfaces according to an exemplary embodiment of the present invention.

Referring to FIGS. 1 and 2, the system for transmitting power based on wireless communication using reconfigurable intelligent reflecting surfaces may include a reconfigurable intelligent reflecting surface (RIS), an electronic device 100, a transmitter 200, and a plurality of receivers 300.

The reconfigurable intelligent reflecting surface (RIS) may include hundreds to thousands of (e.g., $M^{RIS} \times N^{RIS}$) unit cells. The reconfigurable intelligent reflecting surface (RIS) (hereinafter, referred to as intelligent reflecting surface) may be formed in a rectangular shape. An RIS tile a partial array having a smaller size than the intelligent reflecting surface (RIS), and each tile includes a plurality of unit cells. Respective tiles have the same size as each other. The size of the tile is set by assuming that the intelligence reflecting surface (RIS) is positioned at an origin point of an entire coordinate system, and the intelligent reflecting surface (RIS) is set so that the transmitter 200 and a plurality of receivers are continuously positioned in the far-field area based on the intelligent reflecting surface (RIS). That is, the intelligent reflecting surface (RIS) supports near-field communication with respect to each receiver 300, while the RIS tile supports far-field communication other than the near-field communication with respect to each receiver 300. Further, the intelligent reflecting surface (RIS) is placed so as to meet a condition of the far-field communication even with respect to the transmitter 200.

Here, the RIS tile is expressed as k (=1, . . . , K). The RIS tile k is a rectangular array having $M^{RIS} \times N^{RIS}$ or less unit cells, and the unit cell is placed on an x-y plane along an x axis and a y axis in a coordinate system. Each unit cell is expressed as a row-column index (m,n) (m=1, . . . , $M_k^{RIS}$; n=1, . . . , $N_k^{RIS}$). X and y-direction unit cell intervals are). A location (m,n) of the unit cell of the RIS tile k in the coordinate system is defined as follows.

$$u_{k,m,n}^{RIS} = \left( d^{RIS,x} \frac{M_k^{RIS}}{Km}, d^{RIS,y} \frac{N_k^{RIS}}{Kn} \right)$$

Here, $$x_i^j \left( = j - \frac{j}{2} - \frac{i}{2} \right)$$

is a j-th grid point in a unit grid having a size of j around the origin.

In an exemplary embodiment, the RIS may be placed on a ceil, and the transmitter 200 and the plurality of receivers 300 of the RIS are placed in the electric field of the RIS. The transmitter 200 may radiate electromagnetic waves toward the RIS by a beamforming technique according to the control of the electronic device 100.

In an exemplary embodiment, the transmitter 200 is a rectangular plane antenna array having $M^{Tx} \times N^{Tx}$ antenna elements. In a transmitter local coordinate system, the location of the antenna element (i,j) is defined as $u_{i,j}^{Tx}$. Each receiver is expressed as l=1, . . . , L.

The transmitter 200 performs beam synthesis through a phase shifter placed in each antenna element.

The electronic device 100 adjusts a beam to head a specific direction $(\theta^{Tx}, \phi^{Tx})$ by controlling a control parameter q of the transmitter 200 similarly to the RIS tile. A signal of the antenna element having a direction control parameter q is defined as in Equation 1.

$$x_{i,j}(q) = \sqrt{2p^{Tx}} \exp\left( -j \frac{2\pi}{\lambda} q^T u_{i,j}^{Tx} \right)$$

Here, $p^{Tx}$ represents power transmitted in one antenna element. Thereafter, a vector of a signal having a direction control q as a variable is defined as follows.

$$x(q) = (x_{i,j}(q))_{\substack{i=1, \ldots, M^{Tx} \\ j=1, \ldots, N^{Tx}}}$$

The electronic device 100 adjusts and reflects the electromagnetic wave incident on the RIS, and simultaneously distribute and transmits to a plurality of receivers 300 requiring power according to a request of each receiver 300. Here, powers requested by the respective receivers may be different from each other. The electronic device 100 may efficiently distribute energy by applying the weight to the multiple beams according to the requested power of each receiver 300.

In an exemplary embodiment, the electronic device 100 controls the directions, the number of, and reception power of multiple beams by controlling the control parameter of each unit cell or tile of the RIS.

Here, the control parameter may include a direction control parameter $c_k$ of each unit cell, a phase control parameter $\omega_k$, and a weight coefficient $\alpha$ assigned to each beam.

The electronic device 100 adjusts an ON/OFF pattern of each unit cell of the RIS by controlling the direction control parameter $c_k$ to make the reflected beam head a desired direction $(\theta_k^{IRS}, \phi_k^{IRS})$. Further, a phase of the reflected wave is adjusted by controlling the phase control parameter $\omega_k$. The direction control parameter of the RIS tile is defined through a u-v coordinate system as follows.

$$c_k = (\sin\theta_k^{RIS} \cos\phi_k^{RIS}, \sin\theta_k^{RIS} \sin\phi_k^{RIS})^T$$

A reflection coefficient of the unit cell (m,n) in the RIS tile k is given as in Equation 2 below.

$$\Gamma_{k,m,n}(c_k, \omega_k) = \exp(j\omega_k)\exp\left( -j \frac{2\pi}{\lambda} c_k^T u_{k,m,n}^{RIS} \right) \quad \text{[Equation 2]}$$

Since the RIS tile is set to be small enough to satisfy far-field characteristics, the incident electromagnetic wave radiated from the transmitter to the RIS tile becomes a plane wave. Therefore, the reflected wave of the RIS tile k may be defined as in Equation 2.

$$E^{ref}(\psi) = \Omega_0(\psi) \sum_{m=1}^{M_k^{RIS}} \sum_{n=1}^{N_k^{RIS}} \Gamma_{k,m,n} \exp\left(j\frac{2\pi}{\lambda}\psi^T u_{k,m,n}^{RIS}\right) E^i =$$ [Equation 2]

$$\Omega_0(\psi)\exp(j\omega_k) \sum_{m=1}^{M_k^{RIS}} \sum_{n=1}^{N_k^{RIS}} \exp\left(j\frac{2\pi}{\lambda}(\psi - c_k)^T u_{k,m,n}^{RIS}\right) E^i$$

Here, $\psi = (\sin\theta\cos\phi, \sin\theta\sin\phi)$ is a u-v coordinate expression of a $(\theta,\phi)$ direction, $\Omega_0(\psi)$ is a radiation pattern of the unit cell, and $E^i$ is an incident wave which is radiated from the transmitter and incident on the RIS. The above equation may be simplified as in Equation 3.

$$E^{ref}(\psi) = \Omega_0(\psi)\exp(j\omega_k) U_k^{RIS}(\psi - c_k) E^i$$ [Equation 3]

Here, $U_k^{RIS}(v)$ is a beam steering function of the RIS tile k representing a gain of the beam in a direction vector $v = (v_x, v_y)^T$ of the u-v coordinate. The steering function $U_k^{RIS}(v)$ is defined as in Equation 4.

$$U_k^{RIS}(v) = M_k^{RIS} N_k^{RIS} \Xi_{M_k^{RIS}}\left(2\pi\frac{d^{RIS,x}}{\lambda}v_x\right)\Xi_{N_k^{RIS}}\left(2\pi\frac{d^{RIS,y}}{\lambda}v_y\right)$$ [Equation 4]

Here, $\Xi_M(x)$ is a Dirichlet function. An incident wave strength becomes the maximum when the transmitter 200 makes the beam head to the RIS tile k. Therefore, when the direction control parameter is set I the RIS tile k, a single focus beam may be formed.

Thereafter, electromagnetic wave power reflected in a $\psi$ direction may be defined as in Equation 4.

$$P(\psi) = \frac{|E^{ref}(\psi)|^2}{2\eta}$$ [Equation 4]

FIG. 3 is a flowchart for describing a method for transmitting power based on wireless communication using reconfigurable intelligent reflecting surfaces according to an exemplary embodiment of the present invention.

Before performing wireless power transmission, the weight coefficient, the number of RIS tiles, the number of beams to be focused, the number of repeated scanning times, etc., may be set in advance.

Referring to FIG. 3, in step S110, the RIS location is search by using the signal by using one antenna element in the transmitter.

The electronic device may identify the location of the receiver, the location of the RIS, etc., based on a reflection signal of a wide beam radiated with one antenna element. In step S120, RIS tiles are scanned as large as the predefined number of beams by the signal radiated through the transmitter. In step S130, a value of a reflection coefficient of each unit cell or tile of the reconfigurable intelligent reflecting surface (RIS) is determined. A method for determining the value of the reflection coefficient will be described below with reference to FIGS. 4A to 15B.

In step S140, the beam is sent to the reconfigurable intelligent reflecting surface (RIS) by controlling the transmitter.

In step S150, the electromagnetic wave signal incident on the reconfigurable intelligent reflecting surface (RIS) is multi-focused on a plurality of receivers by setting an on/off state in each unit cell of the reconfigurable intelligent reflecting surface (RIS) based on the determined control parameter value to simultaneously charge the plurality of receivers based on the reception power of each receiver.

FIGS. 4A to 4D are diagrams for describing a method for controlling a control parameter in order to send multiple beams according to a first exemplary embodiment of the present invention. FIGS. 4A to 4D may be performed by the electronic device 100 described in FIGS. 1 to 3.

For convenience of description, the method for controlling the control parameter to send multiple beams according to the first exemplary embodiment is referred to as a pattern addition technique.

In the pattern addition technique, it is assumed that L different beams are formed by respective tiles. Here, L is the same as the number of receivers.

The electronic device 100 uses the direction and phase control parameters $c_{k,l}$ and $\omega_{k,l}$ of the RIS tile k to concentrate the power on an l-th beam in the $(\theta_{k,l}^{RIS}, \phi_{k,l}^{RIS})$ direction. Then, the electronic device 100 derives the reflection coefficient of the unit cell (m,n) of the RIS tile k by Equation 5 below.

$$g_{k,m,n}^{PA}(C_k, \omega_k, \alpha) = \sum_{l=1}^{L} \alpha_l \Gamma_{k,m,n}(c_{k,l}, \omega_{k,l})$$ [Equation 5]

Here, $c_k = (c_{k,1}, \ldots, c_{k,L})^T, \omega_k = (\omega_{k,1}, \ldots, \omega_{k,L})^T$, $\alpha = (\alpha_1, \ldots, \alpha_L)^T$ and $\alpha_l$ are weight coefficients of the l-th beam which determine how much power is delivered in the RIS tile k and the l-th beam is focused, and $\alpha_l$ is expressed as in Equation 6.

$$\sum_{l=1}^{L} \alpha_l = 1$$ [Equation 6]

Here, since the RIS tile supports the far-field communication, the reflected wave of the RIS tile k may be represented as in Equation 7.

[Equation 7]

$$E^{ref}(\psi) =$$

$$\Omega_0(\psi) \sum_{m=1}^{M_k^{RIS}} \sum_{n=1}^{N_k^{RIS}} g_{k,m,n}^{PA}(C_k, \omega_k, \alpha) \exp\left(j\frac{2\pi}{\lambda}\psi^T u_{k,m,n}^{RIS}\right) E^i =$$

$$\Omega_0(\psi) \sum_{m=1}^{M_k^{RIS}} \sum_{n=1}^{N_k^{RIS}} \left(\sum_{l=1}^{L} \alpha_l \exp(j\omega_{k,l}) \exp\left(j\frac{2\pi}{\lambda}(\psi - c_{k,l})^T u_{k,m,n}^{RIS}\right)\right) E^i =$$

$$\Omega_0(\psi) \sum_{l=1}^{L} \alpha_l \exp(j\omega_{k,l}) U_k^{RIS}(\psi - c_{k,l}) E^i$$

In Equation 7, $U_k^{RIS}(\psi - c_{k,l})$ has a maximum gain $M_k^{RIS} N_k^{RIS}$ in a direction $c_{k,l}$ (i.e., $\psi = c_{k,l}$). Further, the reflection signal of the RIS tile is a sum of L different beam steering functions $U_k^{RIS}(\bullet)$ having different weights $\alpha_l$. Therefore, L maximums is formed in different directions by different direction control parameters. The strength of each beam is controlled by a weight factor $\alpha_l$.

Referring to FIGS. 4A to 4D, an RIS reflection phase and a signal strength on a u-v plane when multi-focusing is performed through the pattern addition technique may be identified. In particular, referring to FIG. 4C, it may be identified that two beams b1 and b2 are correctly formed. In FIG. 4C, being closer to a red color (intended beams IB1 and IB2) indicates that the power is stronger.

In summary, in determining the control parameter through the pattern addition technique, when there are one or more beams formed by a predetermined tile, a reflection coefficient acquired by applying the weight to each beam is calculated. For example, when B1 and B2 are two, and respective reflection coefficients are $\tau 1$ and $\tau 2$, and the weights are $\alpha 1$ and $\alpha 2$, the reflection coefficient of the tile may be represented by a sum $\alpha 1 \times \tau 1$ which is a reflection efficient of the beam B to which the weight is applied and $\alpha 2 \times \tau 2$ which is a reflection coefficient of the beam B2 to which the weight is applied.

With respect to one or more beams formed by the tile, a value (hereinafter, referred to as reflection coefficient to which the weight is applied) acquired by applying the weight to the reflection coefficient of each beam is calculated, and with respect to all beams formed by the tile, a value acquired by adding the reflection coefficients to which the respective weights are applied is determined as the reflection coefficient of the tile.

FIG. 5 is a graph showing reception power of each receiver depending on the number of scanning times according to the first exemplary embodiment of the present invention.

Referring to FIG. 5, a graph for the power received by the receiver according to the pattern addition technique in the first exemplary embodiment is described.

As can be seen with reference to FIG. 5, it can be seen that 64 tiles of the RIS are scanned three times.

First, a $1^{st}$ iteration period represents the power received by each receiver upon first RIS tile scanning and a $2^{nd}$ iteration period represents the power received by each receiver upon second RIS tile scanning.

A diamond type solid-line graph represents reception power when the weight is set to 0.5 for each of a first receiver and a second receiver, and a circle type solid-line graph represents reception power when the weights are set to 0.7 and 0.3 for the first receiver and the second receiver, respectively.

Last, a dotted-line graph and a snowflake type graph represent reception power when the RIS is turned off. Even though the power is not supplied to the RIS, the electromagnetic wave is reflected by a reflection surface with a random phase. Therefore, it may be identified that the reception power of each receiver is remarkably raised after scanning of twice or more by comparing with a case of turning off the RIS.

FIGS. 6A and 6B are diagrams illustrating a propagation strength normalized to an X-Y plane depending on weight setting according to the first exemplary embodiment of the present invention.

FIG. 6A illustrates the propagation strength when the weight is set to 0.5 for each of a first receiver and a second receiver, and FIG. 6B illustrates the propagation strength when the weights are set to 0.7 and 0.3 for the first receiver and the second receiver, respectively. The higher the radio wavelength strength, the closer it is to be red.

Referring to FIGS. 6A and 6B, it may be identified that the propagation strength is concentrated on the receiver. Further, it can be seen that the reception power at a place where the weight is set to be higher is shown to be higher.

FIGS. 7A and 7B are diagrams illustrating an RSI reflection phase set according to the first exemplary embodiment of the present invention.

FIG. 7A illustrates the RIS reflection phase when the weight is set to 0.5 for each of a first receiver and a second receiver, and FIG. 7B illustrates the RIS reflection phase when the weights are set to 0.7 and 0.3 for the first receiver and the second receiver, respectively.

In FIGS. 7A and 7B, one rectangular box means one unit cell, and the phase of the unit cell in a 1-bit RIS has any one of 0 degree or 180 degrees. The RIS reflection phase of FIGS. 7A and 7B is an example of a pattern formed according to the reflection coefficient determined in step S130 of FIG. 3.

FIGS. 8A and 8B are diagrams for describing a method for controlling a control parameter in order to send multiple beams according to a second exemplary embodiment of the present invention. FIGS. 8A and 8B may be performed by the electronic device 100 described in FIGS. 1 to 3.

For convenience of description, the method for controlling the control parameter to send multiple beams according to the second exemplary embodiment is referred to as a Random Unit Cell Interleaving (RUI) technique.

When multiple beams are intended to be implemented in one RIS, multiple focus beams may be used by uniformly assigning the unit cell to each beam as in FIG. 8A. However, since the number of unit cells are smaller than that when steering a single beam, and an element interval is large, this technique generates an unintended beam (e.g., Grating Lobes), and as a result, an output strength in an intended direction decreases. In order to solve such a problem, multiple focus beams are used by randomly assigning the unit cell to a specific beam. The reflection coefficient for each tile is determined, and a random probability variable is applied to an initial reflection coefficient of each unit cell included in a predetermined tile to calculate a final reflection coefficient.

FIG. 8B illustrates unit cell assignment using the RUI technique in the case of using four beams. $\vartheta_{k,m,n}^{RUI}$ represents the reflection coefficient of the unit cell (m,n) in the RIS tile k by the RUIC technique. $\vartheta_{k,m,n}^{RUI}$ is expressed as in Equation 8.

$$\vartheta_{k,m,n}^{RUI} = \Gamma_{(k,m,n),(a_{m,n})}(c_{k,a_{m,n}}, \omega_{k,a_{m,n}}) \qquad \text{[Equation 8]}$$

Here, a probability for random assignment may be represented as in Equation 9.

$$P(\alpha_{m,n} = l) = \rho_l \qquad \text{[Equation 9]}$$

$$\sum_{l=1}^{L} \rho_l = 1, 0 \le \rho_l \le 1$$

is defined.

Here, $p_l$ represents a probability that the reflection coefficient of the unit cell (m,n) will be assigned to the l-th beam.

$a_{m,n}$ is independently assigned to each unit cell of the RIS tile. In other words, the assignment is an independent process for the unit cell.

Thereafter, a wave reflected in the RIS tile k is expressed as in Equation 10.

$$E^{ref}(\psi) = \Omega_0(\psi) \sum_{m=1}^{M_k^{RIS}} \sum_{n=1}^{N_k^{RIS}} g_{k,m,n}^{RUI} \exp\left(j\frac{2\pi}{\lambda}\psi^T u_{k,m,n}^{RIS}\right) E^i = \qquad \text{[Equation 10]}$$

-continued $$\Omega_0(\psi) \sum_{m=1}^{M_k^{RIS}} \sum_{n=1}^{N_k^{RIS}} \Gamma_{(k,m,n),(a_{m,n})} \exp\left(j\frac{2\pi}{\lambda}\psi^T u_{k,m,n}^{RIS}\right) E^i$$

Here, $\vartheta_{(k,m,n),(a_{m,n})}^{RUI}$ represents a random probability variable between L different reflection coefficients. A mean of the reflected wave, i.e., an expected value is expressed as in Equation 11.

[Equation 11]

$$\mathbb{E}[E^{ref}(\psi)] =$$

$$\Omega_0(\psi) \sum_{m=1}^{M_k^{RIS}} \sum_{n=1}^{N_k^{RIS}} \mathbb{E}[\Gamma_{(k,m,n),(a_{m,n})}] \exp\left(j\frac{2\pi}{\lambda}\psi^T u_{k,m,n}^{RIS}\right) E^i =$$

$$\Omega_0(\psi) \sum_{m=1}^{M_k^{RIS}} \sum_{n=1}^{N_k^{RIS}} \left(\sum_{l=1}^{L} \rho_l \Gamma_{(k,m,n),(l)}\right) \exp\left(j\frac{2\pi}{\lambda}\psi^T u_{k,m,n}^{RIS}\right) E^i =$$

$$\Omega_0(\psi) \sum_{l=1}^{L} \rho_l \exp(j\omega_{k,l}) U_k^{RIS}(\psi - c_{k,l}) E^i$$

FIG. 9 is a graph showing reception power of each receiver depending on the number of scanning times according to the second exemplary embodiment of the present invention. Referring to FIG. 9, a graph for the power received by the receiver according to the random unit cell interleaving technique in the second exemplary embodiment is described.

As can be seen with reference to FIG. 9, it can be seen that 64 tiles of the RIS are scanned three times.

First, a 1$^{st}$ iteration period represents the power received by each receiver upon first RIS tile scanning and a 2$^{nd}$ iteration period represents the power received by each receiver upon second RIS tile scanning.

A diamond type solid-line graph represents reception power when the weight is set to 0.5 for each of a first receiver and a second receiver, and a circle type solid-line graph represents reception power when the weights are set to 0.7 and 0.3 for the first receiver and the second receiver, respectively.

Last, a dotted-line graph and a snowflake type graph represent reception power when the RIS is turned off. Even though the power is not supplied to the RIS, the electromagnetic wave is reflected by a reflection surface with a random phase. Therefore, it may be identified that the reception power of each receiver is remarkably raised after scanning of twice or more by comparing with a case of turning off the RIS.

FIGS. 10A and 10B are diagrams illustrating a radio wave strength normalized to an X-Y plane depending on weight setting according to the second exemplary embodiment of the present invention.

FIG. 10A illustrates the propagation strength when the weight is set to 0.5 for each of a first receiver and a second receiver, and FIG. 6B illustrates the propagation strength when the weights are set to 0.7 and 0.3 for the first receiver and the second receiver, respectively. The higher the radio wavelength strength, the closer it is to be red.

Referring to FIGS. 10A and 10B, it may be identified that the propagation strength is concentrated on the receiver. Further, it can be seen that the reception power at a place where the weight is set to be higher is shown to be higher.

FIGS. 11A and 11B are diagrams illustrating an RIS reflection phase set according to the second exemplary embodiment of the present invention.

FIG. 11A illustrates the RIS reflection phase when the weight is set to 0.5 for each of a first receiver and a second receiver, and FIG. 11B illustrates the RIS reflection phase when the weights are set to 0.7 and 0.3 for the first receiver and the second receiver, respectively.

In FIGS. 11A and 11B, one rectangular box means one unit cell, and the phase of the unit cell in a 1-bit RIS has any one of 0 degree or 180 degrees. The RIS reflection phase of FIGS. 11A and 11B is an example of a pattern formed according to the reflection coefficient determined in step S130 of FIG. 3.

FIG. 12 is a diagram for describing a method for controlling a control parameter in order to send multiple beams according to a third exemplary embodiment of the present invention. FIG. 12 may be performed by the electronic device 100 described in FIGS. 1 to 3.

For convenience of description, the method for controlling the control parameter to send multiple beams according to the third exemplary embodiment is referred to as a RIS Tile Division Technique (RUI).

The tile division technique conducts scanning after assigning each tile of the RIS to a specific receiver. For example, for convenience of description, when there are four tiles in the RIS and two receivers are assumed as in FIG. 12, among four tiles, tiles T1 and T3 are assigned to a receiver Rx2, and tiles T2 and T4 are assigned to a receiver Rx1, and then the reception power delivered to the receiver is calculated by each tile to determine an optimal reflection coefficient.

That is, the tile division technique may be a technique that efficiently assigns an RSI tile set to a specific receiver. In order to efficiently assign the RIS tile, first, reception power delivered to an l-th receiver is calculated by the RIS tile k. A signal delivered to the l-th receiver is given as in Equation 12.

$$y_{k,l} = (H_k^{Tx-RIS} G_k h_{k,l}^{RIS-Rx})^T x(q) \qquad \text{[Equation 12]}$$

Here, $G_k = \text{diag}(\Gamma_k)$ is a diagonal matrix acquired by diagonalizing a reflection coefficient vector $\Gamma_k$, $H_w^{Tx-RIS}$ is a channel matrix between the transmitter and the RIS tile k, and $h_{k,l}^{RIS-Rx}$ is a channel vector between the RIS tile and the l-th receiver. A total reception power in the l-th receiver is given as in Equation 13.

$$P_l = \frac{\left|\sum_{k=1}^{K} y_{k,l} + \gamma(x(q))\right|^2}{2} \qquad \text{[Equation 13]}$$

In this case, $$y(x(q)) = (h^{Tx-Rx})^T x(q),$$

When the control and phase control parameters $(\omega_k, c_k)$ used in the RIS tile k are used, the power received by the l-th receiver is expressed as in Equation 14 and as follows.

$$P(\omega_k, c_k) = \frac{|X_l + \exp(j\omega_k) Y_l(c_k)|^2}{2} = \qquad \text{[Equation 14]}$$
$$\frac{(X_l + \exp(j\omega_k) Y_l(c_k))(X_l^* + \exp(-j\omega_k) Y_l(c_k)^*)}{2}$$

In this case, $$X_l = \sum_{\substack{\bar{k}=i,\ldots,K \\ \bar{k}=k}} +\gamma(x(q)),$$

$$Y_l(c_k) = \frac{y_{k,l}}{\exp(j\omega_k)}$$

The RIS tile k is scanned by using two different phase control parameters (e.g., $\omega_k=0,\pi$) in order to calculate the reception power delivered to the l-th receiver by the RIS tile k. Measurement data may be taken from an RIS tile scanning algorithm. The reception power having two phases is shown as in Equation 15.

$$P_l(0, c_k) = \frac{|X_l|^2 + |Y_l(c_k)|^2 + X_l^* Y_l(c_k) + X_l Y_l(c_k)^*}{2}$$ [Equation 15]

$$P_l(\pi, c_k) = \frac{|X_l|^2 + |Y_l(c_k)|^2 - X_l^* Y_l(c_k) - X_l Y_l(c_k)^*}{2}$$

Then, the reception power delivered by the RIS tile k at the time of adjusting the direction control parameter $c_k$ is shown as in Equation 16.

$$|Y_l(c_k)|^2 = P_l(0,c_k) + P_l(\pi,c_k) - |X_l|^2$$ [Equation 16]

In order to find a power (i.e., $|X_l|^2$) delivered from another RIS tile, other tiles are fixed except for k, and then multiple scan patterns are applied to the RIS tile k, which is scanned. Each scan pattern is generated from one direction control parameter. $L_k^{RIS}$ represents the number of scan patterns, and $c_k^s$ represents a direction control parameter as an s-th scan pattern. The power delivered from another RIS tile is obtained as in Equation 17.

$$|X_l|^2 = \min_{s=1,\ldots,L_k^{RIS}} P_l(0, c_k^{(s)}) + P_l(\pi, c_k^{(s)})$$ [Equation 17]

Consequently, the power delivered to the receiver by the RIS tile k may be calculated. An amount of the power delivered to the receiver by the RIS tile significantly varies depending on a relative location between the receiver and the RIS. Therefore, in order to guarantee the equality between the receivers, a reception power increase rate is used as an index for assigning the RIS tile instead of an actual power delivered by the RIS tile. An optimal direction control variable of the RIS tile k for the l-th receiver is represented by $c_{k,l}^{opt}$, and the increase rate of the power received by the l-th receiver is defined as in Equation 18.

$$\delta_{k,l} = \frac{|Y_l(c_{k,l}^{opt})|^2}{|X_l|^2}$$ [Equation 18]

In the following case, the RIS tile k is assigned to the l-th receiver.

$$l = \underset{l=1,\ldots,L}{\mathrm{argmax}}\, \alpha_l \delta_{k,l}$$

Here, $\alpha_l$ represents a tile division weight coefficient of the l-th receiver.

$$\sum_{l=1}^{L} \alpha_l = 1$$

By adjusting a tile division weight coefficient, the amount of power received by each receiver may be adjusted according to a demand.

FIG. 13 is a graph showing reception power of each receiver depending on the number of scanning times according to the third exemplary embodiment of the present invention. Referring to FIG. 13, a graph for the power received by the receiver according to the pattern addition technique in the third exemplary embodiment is described.

As can be seen with reference to FIG. 13, it can be seen that 64 tiles of the RIS are scanned three times.

First, a $1^{st}$ iteration period represents the power received by each receiver upon first RIS tile scanning and a $2^{nd}$ iteration period represents the power received by each receiver upon second RIS tile scanning.

A diamond type solid-line graph represents reception power when the weight is set to 0.5 for each of a first receiver and a second receiver, and a circle type solid-line graph represents reception power when the weights are set to 0.7 and 0.3 for the first receiver and the second receiver, respectively.

Last, a dotted-line graph and a snowflake type graph represent reception power when the RIS is turned off. Even though the power is not supplied to the RIS, the electromagnetic wave is reflected by a reflection surface with a random phase. Therefore, it may be identified that the reception power of each receiver is remarkably raised after scanning of twice or more by comparing with a case of turning off the RIS.

FIGS. 14A and 14B are diagrams illustrating a propagation strength normalized to an X-Y plane depending on weight setting according to the third exemplary embodiment of the present invention.

FIG. 14A illustrates the propagation strength when the weight is set to 0.5 for each of a first receiver and a second receiver, and FIG. 14B illustrates the propagation strength when the weights are set to 0.7 and 0.3 for the first receiver and the second receiver, respectively. The higher the propagation strength, the closer it is to be red.

Referring to FIGS. 14A and 14B, it may be identified that the propagation strength is concentrated on the receiver. Further, it can be seen that the reception power at a place where the weight is set to be higher is shown to be higher.

FIGS. 15A and 15B are diagrams illustrating an RSI reflection phase set according to the first exemplary embodiment of the present invention.

FIG. 15A illustrates the RIS reflection phase when the weight is set to 0.5 for each of a first receiver and a second receiver, and FIG. 15B illustrates the RIS reflection phase when the weights are set to 0.7 and 0.3 for the first receiver and the second receiver, respectively.

In FIGS. 15A and 15B, one rectangular box means one unit cell, and the phase of the unit cell in a 1-bit RIS has any one of 0 degree or 180 degrees. The RIS reflection phase of FIGS. 15A and 15B is an example of a pattern formed according to the reflection coefficient determined in step S130 of FIG. 3.

FIG. 16 is a diagram for describing an electronic device according to an exemplary embodiment of the present invention. According to an exemplary embodiment, the electronic device may include a reconfigurable intelligent reflecting surface (RIS) 110 including a plurality of unit cells, and a control unit 120.

The control unit 120 scans each tile of the reconfigurable intelligent reflecting surface (RIS) by the signal radiated through the transmitter to determine the value of the reflection coefficient of each unit cell or tile, and sets an on/off state in each unit cell of the reconfigurable intelligent reflecting surface RIS based on the determined control parameter value to control the reconfigurable intelligent reflecting surface (RIS) so as to multi-focus the electromagnetic signal incident on the reconfigurable intelligent reflecting surface (RIS) on a plurality of receivers.

By the method for transmitting power in wireless communication using a reconfigurable intelligent reflecting surface (RIS) according to an exemplary embodiment of the present invention as described above, multiple devices requiring different reception powers may be simultaneously wirelessly charged.

Further, the reception power may be adaptively provided to a receiver which moves within an electromagnetic field of the RIS by repeatedly performing scanning.

The above description just illustrates the technical spirit of the present invention and various changes and modifications can be made by those skilled in the art to which the present invention pertains without departing from an essential characteristic of the present invention. Accordingly, various exemplary embodiments executed in the present invention are not intended to limit the technical spirit but describe the present invention and the technical spirit of the present invention is not limited by the following exemplary embodiments. The protective scope of the present invention should be construed based on the following claims, and all the technical concepts in the equivalent scope thereof should be construed as falling within the scope of the present invention.

The invention claimed is:

1. A method for transmitting power in wireless communication using reconfigurable intelligent reflecting surfaces (RIS) of an electronic device, the method comprising:
    determining a value of a reflection coefficient of each unit cell or tile by scanning each tile of a reconfigurable intelligent reflecting surface (RIS) by a signal radiated through a transmitter;
    sending a beam to the reconfigurable intelligent reflecting surface (RIS) by controlling the transmitter; and
    multi-focusing an electromagnetic wave signal incident on the reconfigurable intelligent reflecting surface (RIS) on a plurality of receivers by setting an on/off state in each unit cell of the reconfigurable intelligent reflecting surface (RIS) based on the determined value of the reflection coefficient of each unit cell or tile,
    wherein the tile is a partial array of the RIS having the a same size, and supports far-field communication for the plurality of receivers.

2. The method of claim 1, wherein a reflection coefficient for each tile is determined, and a reflection coefficient acquired by applying a predetermined weight to an initial reflection coefficient of each beam is calculated, and a value acquired adding reflection coefficients acquired by applying respective weights to all beams formed by the tile is determined as a final reflection coefficient.

3. The method of claim 2, wherein a number of the all beams formed by the tile is the same as the number of the plurality of receivers.

4. The method of claim 1, wherein the reflection coefficient for each tile is determined, and a final reflection coefficient is calculated by applying a random probability variable to an initial reflection coefficient of each unit cell.

5. The method of claim 1, wherein a predetermined receiver is assigned to each tile in advance, and the reflection coefficient for each tile is determined.

6. The method of claim 5, wherein the predetermined receiver is assigned to each tile based on a reception power increase rate of the predetermined receiver.

7. The method of claim 1, further comprising:
    before the determining the value of the reflection coefficient of each unit cell or tile,
    controlling the transmitter to search an RIS location by radiating a signal by using one antenna element.

8. An electronic device comprising:
    a reconfigurable intelligent reflecting surface (RIS) including a plurality of unit cell arrays; and
    a control unit scanning each tile of the reconfigurable intelligent reflecting surface (RIS) by a signal radiated through a transmitter to determine a value of a reflection coefficient of each unit cell or tile, and sets an on/off state in each unit cell of the reconfigurable intelligent reflecting surface RIS based on the determined value of the reflection coefficient of each unit cell or tile to control the reconfigurable intelligent reflecting surface (RIS) so as to multi-focus the electromagnetic signal incident on the reconfigurable intelligent reflecting surface (RIS) on a plurality of receivers,
    wherein the tile is a partial array of the RIS having a same size and supports far-field communication.

9. The electronic device of claim 8, wherein the control unit determines a reflection coefficient for each tile and calculates a reflection coefficient acquired by applying a predetermined weight to an initial reflection coefficient of each beam, and determines a value acquired adding reflection coefficients acquired by applying respective weights to all beams formed by the tile as a final reflection coefficient.

10. The electronic device of claim 8, wherein a number of the all beams formed by the tile is the same as the number of the plurality of receivers.

11. The electronic device of claim 8, wherein the control unit determines the reflection coefficient for each tile and calculates a final reflection coefficient by applying a random probability variable to an initial reflection coefficient of each unit cell.

12. The electronic device of claim 8, wherein the control unit assigns a predetermined receiver to each tile in advance and determines the reflection coefficient for each tile.

13. The electronic device of claim 12, wherein the control unit assigns the predetermined receiver to each tile based on a reception power increase rate of the predetermined receiver.

14. The electronic device of claim 8, wherein the control unit controls the transmitter to search an RIS location by radiating a signal by using one antenna element.

\* \* \* \* \*